(12) United States Patent
Du et al.

(10) Patent No.: US 8,818,048 B2
(45) Date of Patent: Aug. 26, 2014

(54) SYSTEM AND METHOD FOR CANCELABLE IRIS RECOGNITION

(75) Inventors: Eliza Yingzi Du, Indianapolis, IN (US); Kai Yang, Indianapolis, IN (US)

(73) Assignee: Indiana University Research and Technology Corp., Indianapolis, IN (US)

( * ) Notice: Subject to any disclaimer, the term of this patent is extended or adjusted under 35 U.S.C. 154(b) by 856 days.

(21) Appl. No.: 13/010,886

(22) Filed: Jan. 21, 2011

(65) Prior Publication Data

US 2011/0182483 A1 Jul. 28, 2011

Related U.S. Application Data

(60) Provisional application No. 61/297,543, filed on Jan. 22, 2010.

(51) Int. Cl.
*G06K 9/00* (2006.01)

(52) U.S. Cl.
CPC .................................... *G06K 9/0061* (2013.01)
USPC ............ 382/115; 382/116; 382/117; 382/118

(58) Field of Classification Search
CPC .................. G06K 2009/00953; G07C 2209/12
See application file for complete search history.

(56) References Cited

U.S. PATENT DOCUMENTS

| | | | | |
|---|---|---|---|---|
| 7,689,006 | B2 * | 3/2010 | Govindaraju et al. | 382/115 |
| 8,005,277 | B2 * | 8/2011 | Tulyakov et al. | 382/125 |
| 2006/0078171 | A1 * | 4/2006 | Govindaraju et al. | 382/115 |
| 2007/0253608 | A1 * | 11/2007 | Tulyakov et al. | 382/125 |
| 2009/0123034 | A1 * | 5/2009 | Bolle et al. | 382/115 |
| 2009/0310830 | A1 * | 12/2009 | Bolle et al. | 382/124 |
| 2010/0046805 | A1 * | 2/2010 | Connell et al. | 382/115 |
| 2010/0046808 | A1 * | 2/2010 | Connell et al. | 382/117 |

OTHER PUBLICATIONS

PalmHashing—biometrics, Connie et al. Elsevier, 2004, 0020-0190, pp. 1-5.*
Biophasor:—biometrics, Teoh et al., IEEE, 1-4244-0342-1, 2006, pp. 1-5.*
Zhi Zhou, Yingzi Du et al.; "Transforming Traditional Iris Recognition Systems to Work in Nonideal Situations"; IEEE Transactions on Industrial Electronics, vol. 56, No. 8, Aug. 2009 (11 pages).
Nalina K. Ratha et al.; "An Analysis of Minutiae Matching Strength"; Proceedings of the Third International Conference on Audio- and Video-Based Biometric Person Authentication, 2001 (7 pages).

(Continued)

*Primary Examiner* — Jayesh A Patel
(74) *Attorney, Agent, or Firm* — Maginot, Moore & Beck, LLP (57) ABSTRACT

A method of generating a biometric feature descriptor has been developed that includes acquiring an image of an anatomical feature having a biometric feature, isolating a region of the image having the biometric feature, extracting image data from the image of the region to identify a plurality of features for the biometric feature, transforming the extracted image data for each identified feature into a plurality of feature descriptors, mapping the feature descriptors for the plurality of features into a first arrangement of feature descriptors, generating a second arrangement of feature descriptors with a non-invertible transform of the first arrangement of feature descriptors, and storing the second arrangement of feature descriptors into an electronic database.

19 Claims, 6 Drawing Sheets

(56) References Cited

OTHER PUBLICATIONS

Umut Uludag et al.; "Attacks on Biometric Systems: A Case Study in Fingerprints"; Proc. SPIE-EI 2004, Security, Seganography and Watermarking of Multimedia Contents VI, 2004 (12 pages).

Nalina K. Ratha et al.; "Enhancing Security and Privacy in Biometrics-Based Authentication Systems"; IBM Systems Journal, vol. 40, No. 3, 2001 (21 pages).

Marios Savvides et al; "Cancelable Biometric Filters for Face Recognition"; Proceedings of the 17th International Conference on Pattern Recognition, 2004 (4 pages).

Jinyu Zuo et al; "Cancelable Iris Biometric"; 19th International Conference on Pattern Recognition, 2008 (4 pages).

Craig Belcher & Yingzi Du; "Region-Based SIFT Approach to Iris Recognition"; Optics and Lasers in Engineering 47, 2009 (10 pages).

David G. Lowe; "Distinctive Image Features from Scale-Invariant Keypoints"; International Journal of Computer Vision, 2004 (28 pages).

Zhenan Sun; "Improving Iris Recognition Accuracy via Cascaded Classifiers"; IEEE Transactions on Systems, Man, and Cybernetics—Part C: Applications and Reviews, 2005 (7 pages).

Jonathon P. Phillips; "The Iris Challenge Evaluation 2005"; Proceedings, Second IEEE International Conference on Biometrics: Theory, Applications, and Systems, 2008 (8 pages).

Hugo Proenca et al.; "The NICE.I: Noisy Iris Challenge Evaluation—Part I"; IEEE, 2007 (4 pages).

* cited by examiner

SYSTEM AND METHOD FOR CANCELABLE IRIS RECOGNITION

PRIORITY CLAIM

This application claims priority from U.S. Provisional Application No. 61/297,543, which is entitled "System And Method For Cancelable Iris Recognition" and was filed on Jan. 22, 2010.

TECHNICAL FIELD

The system and method described below relate to the identification of a person or an animal with reference to external physical characteristics of the person or animal, and, more specifically, with reference to externally observable physical characteristics of one or more eyes of the person or animal.

BACKGROUND

Systems for identifying persons through intrinsic human traits have been developed. These systems operate by taking images of a physiological trait of a person and comparing information stored in the image to image data corresponding to the imaged trait for a particular person. Since these systems take the measure, or "metric" of a portion of a person or other biological being from the image data, they are commonly referred to as "biometric" systems. When the information stored in the image has a high degree of correlation to the relevant data previously obtained for a particular person's trait, positive identification of the person may be obtained. These biometric systems obtain and compare data for physical features, such as fingerprints, voice, facial characteristics, iris patterns, hand geometry, retina patterns, and hand/palm vein structure. Different traits impose different constraints on the identification processes of these systems. For example, fingerprint recognition systems require the person to be identified to contact an object directly for the purpose of obtaining fingerprint data from the object. Similarly, retina pattern identification systems require a person to allow an imaging system to scan the retinal pattern within one's eye for an image capture of the pattern that identifies a person. Facial feature recognition systems, however, do not require direct contact with a person and these biometric systems are capable of capturing identification data without the cooperation of the person to be identified.

One trait especially suited for non-cooperative identification is an iris pattern in a person's eye. The human eye iris provides a unique trait that changes little over a person's lifetime. For cooperative iris recognition, the person to be identified is aware of an image being taken and the captured image is a frontal view of the eye. Non-cooperative iris image capture systems, on the other hand, obtain an iris image without a person's knowledge of the data capture. Thus, the subject's head is likely moving and his or her eyes are probably blinking during iris image acquisition. Consequently, the captured image is not necessarily a frontal view of the eye.

While current biometric systems, including systems using the iris, are already used modern society, they also have drawbacks. One such drawback is the danger that a biometric parameter may be compromised or "stolen" by a malicious party. For example, hypothetical person Alice may have an image of her iris registered with a current biometric identification system. Alice's iris is not a secret as any photograph of Alice's face likely shows her eyes, and any party with a camera could take a photograph of her eyes as well. If Bob is a malicious party, he could acquire a valid image of one or both of Alice's eyes and use those images to convince a biometric system that Bob is in fact Alice. With a convincing enough model of Alice's iris, Bob could fool the camera of a biometric system into thinking that he is in fact Alice. This problem is compounded by the fact that some modern biometric identification systems use computer networks such as the Internet to transmit images to remote databases, allowing Bob to bypass the camera and submit false image data directly to the biometric system.

The above scenario presents grave problems for Alice. Once Alice's relevant biometrics such as images of her eyes are known, any attacker that can produce a reasonable facsimile of Alice's biometrics may spoof a biometric system. Alice's irises are not secrets, and they cannot be changed in any practical manner if an attacker duplicates them. Thus, in current biometric systems it is practically impossible to tell the difference between Alice and Bob, if Bob is able to make a duplicate of Alice's biometrics convincing enough to spoof an automated system. Recent proposals to improve the security of these biometric systems describe "cancelable biometrics" wherein a non-invertible or one-way transformation is applied to the biometric image data using cryptographic techniques (see N. K. Ratha et al., *Enhancing Security and Privacy in Biometrics-Based Authentication Systems*. IBM Systems Journal, 40(3):614-634, 2001). These methods employ a non-invertible transformation to hide the true biometric pattern and produce many different unique patterns that may be replaced or "canceled" if one unique pattern were to be compromised by an attacker (see also M. Savvides et al., *Cancelable Biometrics Filters for Face Recognition*, Proc. Int'l Conf. Pattern Recognition, vol. 3, pp. 922-925, 2005; J. Zuo. et al. *Cancelable Iris Biometric Pattern Recognition*, 2008. $19^{th}$ International Conference on Pattern Recognition, 2008) However, all these systems have the negative side-effect of making identification less accurate. A method of biometric identification that allows for both cooperative and non-cooperative imaging, improves the accuracy of identification, and allows for the cancellation of a compromised biometric signature would be beneficial.

SUMMARY

A method of generating a biometric feature descriptor has been developed that includes acquiring an image of an anatomical feature having a biometric feature, isolating a region of the image having the biometric feature, extracting image data from the image of the region to identify a plurality of features for the biometric feature, transforming the extracted image data for each identified feature into a plurality of feature descriptors, mapping the feature descriptors for the plurality of features into a first arrangement of feature descriptors, generating a second arrangement of feature descriptors with a non-invertible transform of the first arrangement of feature descriptors, and storing the second arrangement of feature descriptors into an electronic database.

In another embodiment, a method for authenticating a biometric feature in an image of an anatomical feature includes acquiring an image of an anatomical feature having a biometric feature, isolating a region of the image having the biometric feature, extracting image data from the image of the region to identify a plurality of features for the biometric feature, transforming the extracted image data for each identified feature into a plurality of feature descriptors, mapping the feature descriptors for the plurality of features into a first arrangement of feature descriptors, generating a second arrangement by applying a non-invertible transform to the first arrangement of feature descriptors, retrieving an arrangement of feature descriptors for a biometric feature previously stored in an electronic database from the electronic database, comparing the second arrangement of feature descriptors to the retrieved arrangement of feature descriptors, generating a signal indicating whether the second arrangement of the feature descriptors for the biometric feature corresponds to the retrieved arrangement of feature descriptors for the biometric feature.

A system for authenticating a biometric feature in an image of an anatomical feature includes a digital camera configured to acquire an image of an anatomical feature having a biometric feature of a subject, an electronic database for storage of at least one arrangement of feature descriptors for the biometric feature, and a digital image processor. The digital image processor is configured to isolate a region of the image having the biometric feature, extract image data from the image of the region to identify a plurality of features for the biometric feature, transform the extracted image data for each identified feature into a plurality of feature descriptors, map the plurality of feature descriptors into a first arrangement of feature descriptors, apply a non-invertible transform to the first arrangement of feature descriptors to generate a second arrangement of feature descriptors, retrieve an arrangement of feature descriptors for a biometric feature from the electronic database, compare the second arrangement of feature descriptors to the retrieved arrangement of feature descriptors, and to generate a signal indicating whether the second arrangement of feature descriptors corresponds to the retrieved arrangement of feature descriptors.

DETAILED DESCRIPTION

For the purposes of promoting an understanding of the principles of the embodiments disclosed herein, reference will now be made to the drawings and descriptions in the following written specification. It is understood that no limitation to the scope of the subject matter is thereby intended. It is further understood that the present disclosure includes any alterations and modifications to the illustrated embodiments and includes further applications of the principles of the disclosed embodiments as would normally occur to one skilled in the art to which this disclosure pertains.

Figure 1:
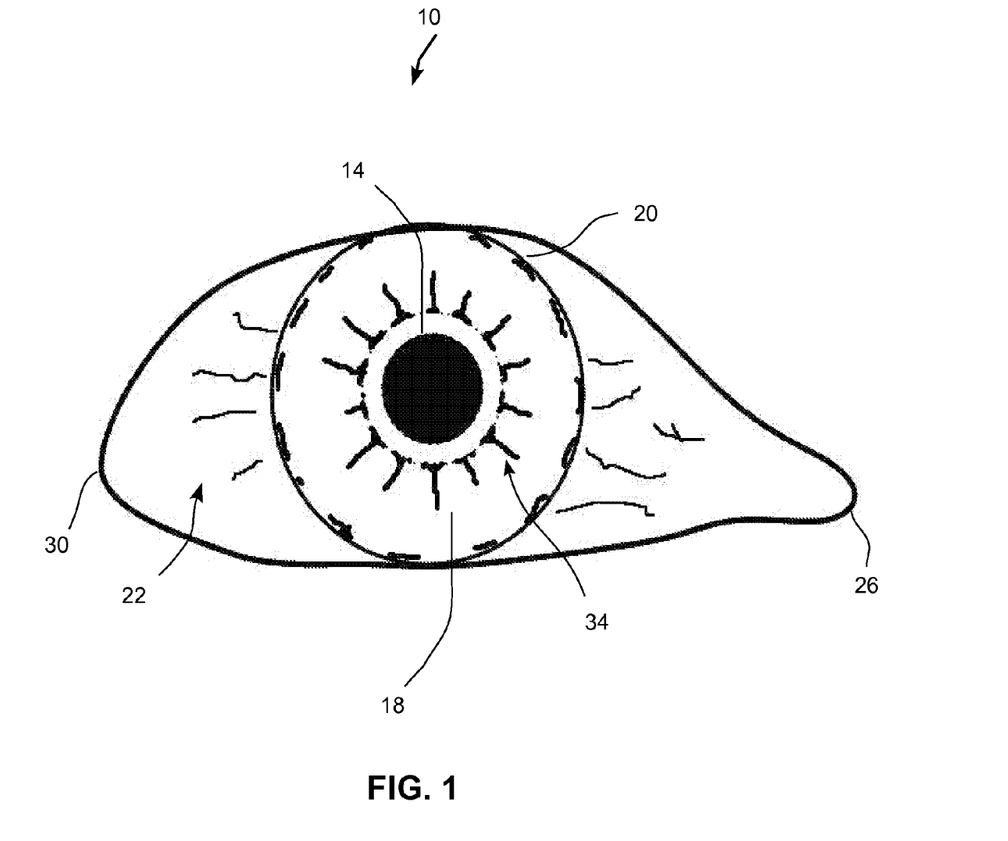
FIG. 1 depicts a frontal image of a human eye and identifies the relevant parts of the image.

An illustration of a human eye is shown in FIG. 1. The eye 10 includes a pupil 14 surrounded by an iris 18. A limbic boundary 20 separates the iris 18 from the sclera region 22. A medial point 26 identifies the area where a tear duct is typically located and the lateral point 30 identifies an outside edge of the image. Within the iris 18 are textured patterns 34. These patterns have been determined to be sufficiently unique that may be used to identify a subject.

Figure 2:
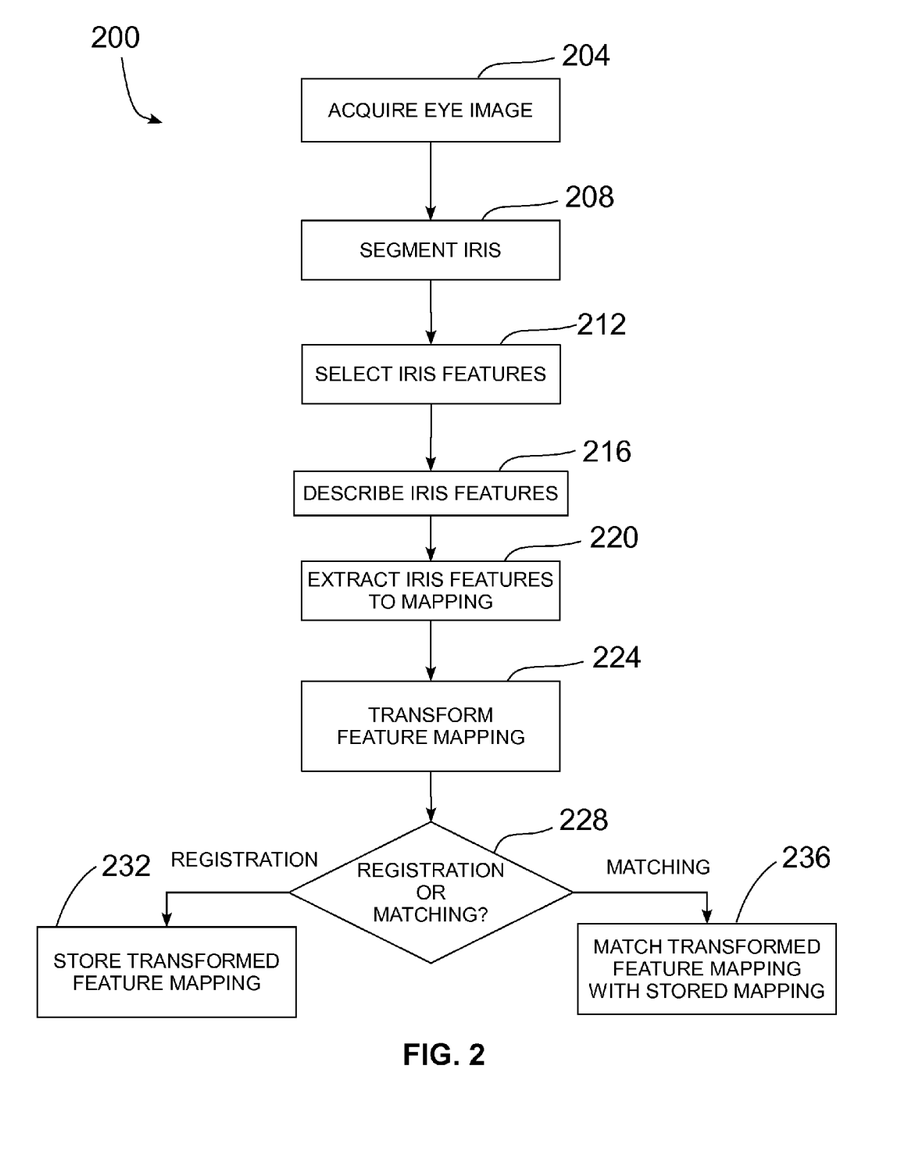
FIG. 2 is a flow diagram of a process for registering and matching an image of an iris.

A method 200 for registering and matching iris patterns that utilizes a non-invertible transformation is depicted in FIG. 2. The method begins by acquiring an image of the subject's eye (block 204). Imaging of an eye may include illumination of the eye in near infrared, infrared, visible, multispectral, or hyperspectral frequency light. The light may be polarized or non-polarized and the illumination source may be close or remote from the eye. A light source close to an eye refers to a light source that directly illuminates the eye in the presence of the subject. A remote light source refers to a light source that illuminates the eye at a distance that is unlikely to be detected by the subject. As noted below, adjustments may be made to the image to compensate for image deformation that may occur through angled image acquisition or eye movement. Thus, the eye image may be a frontal image or a deformed image. The image acquisition may be performed with a digital camera having an adequate resolution for imaging features within the iris of the subject's eye.

The method 200 continues by segmenting the eye image to isolate the region of the image containing the iris (block 208) The segmentation extracts a region of the image containing the pupil at the center with the iris surrounding the pupil. In one embodiment, the pupil acts as the center of the segmented region, with other portions of the iris being described using polar coordinates that locate features using an angle and distance from the center of the pupil. The isolated iris region is subdivided into a series of sub-regions and only one feature point is allowed per sub-region for further processing.

After the iris region is segmented, one or more features present in the iris image are detected and extracted (block 212). The features in question include any unique textures or structural shapes present in the iris region of the eye image. In one embodiment, the stable feature points which are invariant to scale, shift, and rotation are identified in each iris pattern. The sub-regions are distributed in a circular pattern about the pupil, with one partition scheme forming 10 sub-regions in the radial direction, and partitioning the full 360° angle about the pupil into 72 sub-regions for a total of 720 sub-regions. Because a feature might lie on the boundary of a sub-region, the partitioning process in an example embodiment is repeated by offsetting the angle at which partitioning begins by 2.5°. The offsetting ensures that a detected feature will always be included in one of the sub-regions.

For each sub-region, extrema points are selected. These extrema points are the points that are tested to be different from its surrounding neighbors, which could be corner points, edge points and feature points. The identified feature points are next described by using a 64-length descriptor that is based on the normalized and Gaussian weighted position of each feature point within a normalized window about the feature point (block 216). In one embodiment, the normalized window includes 4 sub-divided bins in the horizontal (x) direction, 4 sub-divided bins in the vertical (y) direction, and 4 subdivided bins corresponding to the magnitude and phase response directions of the feature point. If each of the 4 bins is thought of as a dimension, the 4×4×4 matrix forms 64 bins, each one of which holds one of the descriptor values that identifies a feature point. The window size around each feature point is determined using the following equation:

$$w = \left\lfloor \sqrt{2} * \left( \sqrt{(x-x_p)^2 + (y-y_p)^2} \right) * \frac{2\pi}{360} * 5 * \frac{N+1}{2} + 0.5 \right\rfloor$$

In the preceding equation, N is the number of bins used to describe a relative position of a point, with N=4 being used in the example embodiment, but the selected value N may be higher or lower. The pupil center is located at $x_p$ and $y_p$, providing a central point from which all other coordinates are measured.

The absolute position of each feature point is normalized to the relative position in each window w using the following equation:

$$(n{\downarrow}x, n{\downarrow}y) = ((x-x{\downarrow}s)\cos\theta + (y-y{\downarrow}s)\sin\theta)/S{\downarrow}R, (-(x-x{\downarrow}s)\sin\theta + (y-y{\downarrow}s)\cos\theta)/S{\downarrow}A$$

Figure 3:
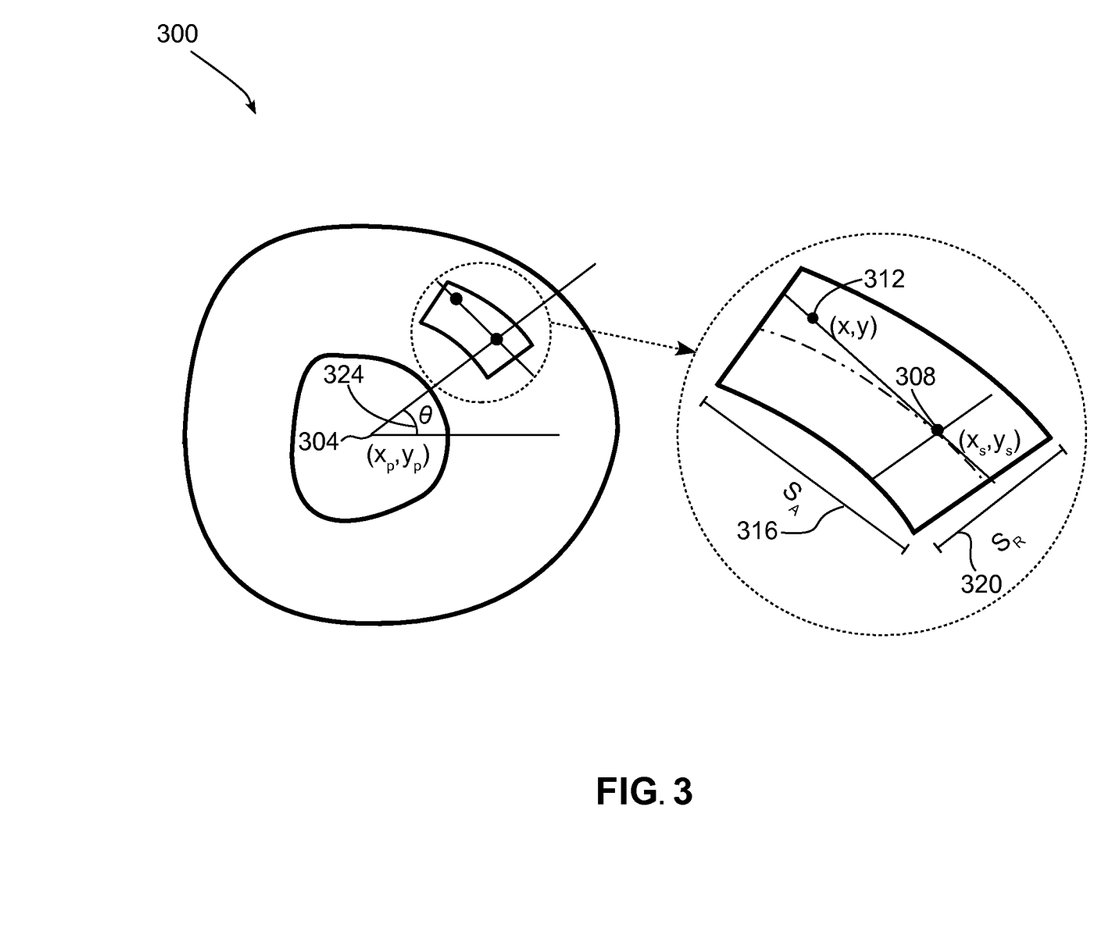
FIG. 3 is a view of a segmented iris and pupil depicting the position of an iris feature in relation to the center of the pupil.

In the preceding equation, $S_R$ is the length of each window in the radial direction, $S_A$ is the window size in each angular direction, $x_s$ and $y_s$ represent the feature point, and $\theta$ represents the angle between a radial line extending from the pupil to the feature and a horizontal line. FIG. 3 presents a visual depiction of an eye image 300 including $x_p$ and $y_p$ at 304, $x_s$ and $y_s$ at 308, x and y at 312, $S_A$ 316, $S_R$ 320, and $\theta$ 324.

The process 200 continues by extracting the described iris feature using a bank of two-dimensional Gabor filters (block 220). The Gabor wavelet G(x,y) is selected by altering the values of the frequency and standard deviation parameters applied as part of the Gabor filter transformation.

After selecting the Gabor filter, each point in the windows described in block 216 is measured for a magnitude and phase response by comparing the point to the single feature point contained in each window. The magnitude and phase are Gaussian weighted, with the weight determined by the following equation:

$$wn = e^{-0.5\left(\frac{(nx)^2}{2\sigma_x^2} + \frac{(ny)^2}{2\sigma_y^2}\right)}$$

Figure 4:
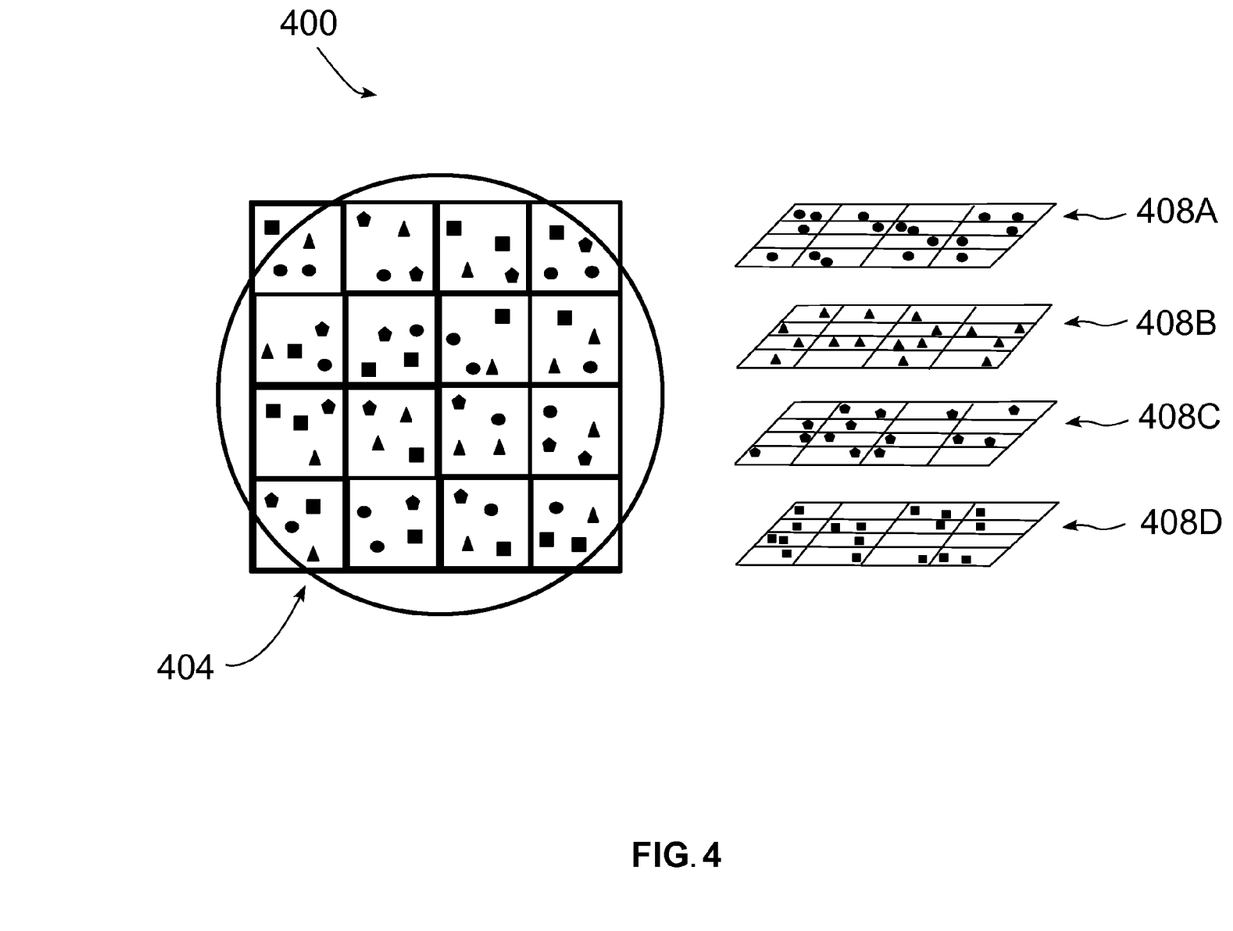
FIG. 4 is an exploded view of a bin arrangement containing iris feature points.

Here, wn is the weight of a particular point x, y compared to the feature point, where $\sigma_y$ is ½N where N is the number of bins used to determine the window size described above and $\sigma_x$ changes based on the size of the window containing point x, y. The final weight of each point is calculated by the following equation:

$$weight = wn \cdot mg$$

where mg represents the magnitude of the selected Gabor wavelet for the point whose weight is being calculated. Once the weight is calculated, the weight is assigned to one of the 64 bins described in block 216. Each weight is assigned to a bin based on the spatial location of the bin relative to the feature point being described. The final 64-length descriptor is calculated by normalizing the calculated descriptors into a unit vector FIG. 4 depicts the 64 bins 400 holding a distribution of feature points 404. An exploded view 408A-D shows each layer in the 64 bin cube and the distribution of features in each bin.

Figure 5:
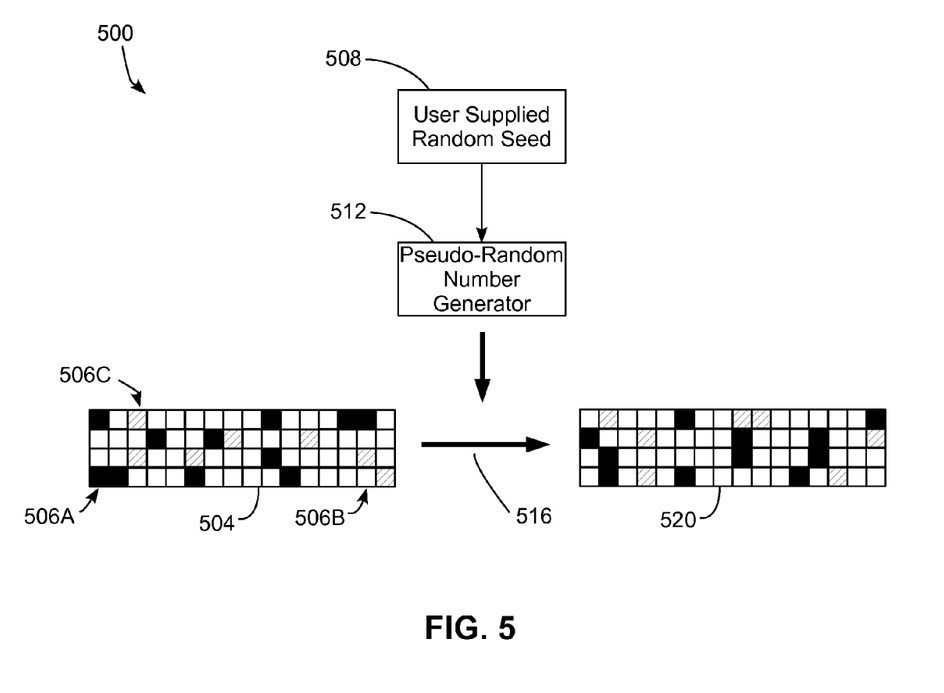
FIG. 5 is a diagram depicting a process of transforming a template representing an iris image into a new template representing the same image.

Referring again to FIG. 2, the iris mapping containing the Gabor filtered descriptor values for each sub-region is now transformed into a new mapping via a non-invertible transformation (block 224). Using one non-invertible transformation method, the example sub-region mapping that contains 10 by 72 sub-regions is non-invertibly transformed by selecting the sub-regions randomly and generating another arrangement of the sub-regions in the order selected to produce a transformed mapping that contains the same sub-regions arranged in the randomly selected order. This mapping is described as being a non-invertibly generated arrangement because the second arrangement cannot be used to regenerate the first mapping arrangement as the random selection process cannot be repeated. The transformed mapping is similar to a deck of cards that has been shuffled from its original order. An example transformation 500 that re-arranges the sub-regions is depicted in FIG. 5. In FIG. 5, the original mapping 504 contains a two-dimensional arrangement of 10 by 72 sub-regions (Note: For clarity, FIG. 5 does not depict every sub-region in the example mapping). The black sub-regions 506A indicate a sub-region that contains a feature point, the white sub-regions 506B indicate a sub-region that does not contain a feature point, and the shaded regions 506C indicate a sub-region that is noisy and that should not be considered in the matching process.

In order to transform the original mapping arrangement 504, the end-user provides a random seed 508 for a pseudo-random number generator 512. This seed may be generated by a physical hardware token that the user keeps in her possession that provides a complex random seed in a secure manner. The pseudo-random number generator 512 may employ any cryptographically secure method of pseudo-random number generation known to the art. The results of the pseudo-random number generator 512 are applied to a transformation process 516 that re-maps each of the sub-regions from the original mapping arrangement 504 into the newly transformed mapping 520. The transformation process 500 of FIG. 5 re-maps the arrangement of the sub-regions, while leaving the contents of the 64-length descriptor in each sub-region unchanged from the original mapping 504. The transformation process 516 is considered non-invertible or a "one way" process because there is no deterministic process for reversing the transformation to return to the original template without previously knowing the sequence of the pseudo-random number generator 512. The pseudo-random number generator 512 will also produce the same numeric sequence when used with the same seed during a future transformation process. This allows for subsequently generated iris mappings to undergo the same transformation, producing a matching transformed mapping arrangement 520. Using the example embodiment of a mapping arrangement with a 72 by 10 sub-region configuration, there are 720! possible arrangements for the transformed mapping 520. The number of possible arrangements is enough that a potential attacker has a negligible probability of guessing the arrangement of the transformed template 520 given the original template 504 using a brute-force attack strategy.

The method of FIG. 2 continues to either store the transformed iris feature mapping, or to compare the iris feature mapping to a previously stored feature mapping, also known as a training template (block 228). If the user is being registered with a biometric identification system (block 232) the transformed mapping arrangement from block 224 is stored as a training template, typically in an electronic database that may optionally contain additional data pertaining to the registered user. The registration process may occur in a controlled environment in order to assure that the new user is properly identified, and to establish the random number sequence that is used for transforming the iris feature mapping.

In the event of matching (block 236), the method of FIG. 2 generates a transformed mapping that is matched against a training template to determine if the combined iris pattern and supplied random seed number produce a matching iris feature mapping. The two offset region maps described in block 212 are each compared to account for features that may fall on the edges of the segmented iris sub-regions. Due to variations in how the iris image is segmented and in the conditions of the eye during imaging, the matching process does not require an exact match to verify that submitted and stored templates are of the same eye. The example process compares the templates in 3 by 5 bin regions to find matches that may be offset from the original template. If sufficient regions match, the two templates are considered to be of the same iris. In the event that either a non-matching iris is scanned, or that an improper random seed is provided, the number of matching regions is insufficient, and the matching process indicates that the scanned iris image does not match the template. A signal, such as an electronic message that may be displayed on a screen or an illuminated light, is generated to indicate whether a match or mismatch has been detected by the method or system described in this document.

The process described in FIG. 2 is merely illustrative of one embodiment for improved iris matching, and other embodiments are envisioned. For example, the selection of a 64 element descriptor for features and the use of a 72 by 10 segmentation arrangement may be modified by one of skill in the art based on desired requirements for computational complexity, accuracy, and data storage in a biometric identification system. Additionally, the random seed and pseudo-random number generator used in FIG. 2 may be embodied by a hardware token that interfaces with a biometric identification system, or the user may remember a secret number such as a personal identification number that seeds a pseudo-random number generator contained in the biometric system. Desired values for coefficients used with the Gaussian and Gabor filters of the foregoing equations may be selected by one of ordinary skill in the art in the regular course of practicing the method of FIG. 2.

A system that may be used to implement the image processing method described above is shown in FIG. 6. The system 600 includes a digital camera 604, a digital image processor 608, a database 612, a hardware token 616, pseudo-random number generator 620, data storage device 624, and display device 628. The digital camera 604, which may generate color or grayscale images, is located at a position where a subject may be standing or seated. The camera need not be positioned where the subject is aware of the camera and, thus, cooperative for providing an image of the subject's eye. The camera may be, for example, a Sony DSLR-A100 camera, although any high resolution digital camera is appropriate. Other cameras that may be used include near infrared, infrared, visible, multispectral, and hyperspectral cameras.

Figure 6:
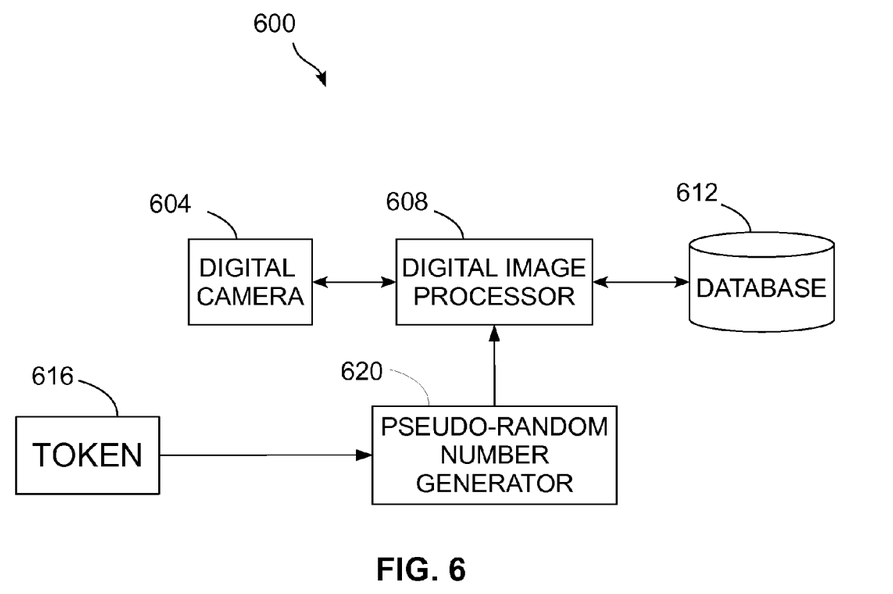
FIG. 6 is a block diagram of a system that may be used to implement the method of FIG. 2.

The digital image processor 608 may be a general purpose microprocessor or a special purpose digital signal processor (DSP). The digital image process 608 may read stored program instructions from the data storage device 624 to perform the operations described herein. Data storage device 624 may be a solid state drive, magnetic hard drive, network-connected data storage, or any computer readable medium. The processor 608 is provided with appropriate interface circuitry for retrieving the image signal from the camera 604 or a stored template from the database 612. The digital image processor 608 is configured to receive a stream of numbers from pseudo-random number generator 620, and to transform the regions of the computed iris templates according to the method of FIG. 2.

Execution of the stored instructions by the processor 608 results in the system 600 performing an image processing method similar to the one described above with reference to FIG. 2. A template generated by the processor 608 may be stored in the database 612 for future comparisons or the generated template may be compared to a stored template to determine whether a subject being imaged corresponds to a subject having a template stored in the database 612. Database 612 may be any appropriate data management system and storage media, such as a database management system having a hard disk drive or other non-volatile memory. In operation, the digital image processor 608 generates a signal that is shown on the display device 628 in response to either matching a generated arrangement of feature descriptors from the scanned image data to a template in the database 612, or identifying that the feature descriptors do not match any templates in the template database 612. The display may show the signal in various forms including activating one or more lights, displaying text or graphics on a display screen, and emitting an audio output such as voice messages in addition to or instead of a visual display. Controller 608 is configured to generate different signals for the display 628 to inform operators and users of system 600 if the feature descriptors for the scanned image data did or did not match a template.

The pseudo-random number generator 620 may exist as a separate hardware module dedicated to generating pseudo-random numbers, or as a software module executed by digital image processor 608. In an alternative embodiment, the pseudo-random number generator 620 may be combined with the token 616 and be connected to the digital image processor 608 at the time a user activates the system 600. The token 616 may be a portable electronic device that is carried by a user and is configured to generate the seed used by the pseudo-random generator 620. In alternative embodiments, the random number seed may instead be a secret number that is remembered by a user or the token may be a card displaying the seed number that the user carries.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of generating a biometric feature descriptor comprising:
   acquiring an image of an anatomical feature having a biometric feature;
   isolating a region of the image having the biometric feature;
   extracting image data from the image of the region to identify a plurality of features for the biometric feature;
   transforming the extracted image data for each identified feature into a plurality of feature descriptors;
   mapping the feature descriptors for the plurality of features into a first two-dimensional arrangement of feature descriptors comprising:
      a first two-dimensional arrangement of regions corresponding to the extracted image data, a first portion of the regions in the first two dimensional arrangement including the plurality of feature descriptors and a second portion of the regions in the first two dimensional arrangement including no feature descriptors;
   generating a second two-dimensional arrangement of feature descriptors with a non-invertible transform of the first two-dimensional arrangement of feature descriptors, the non-invertible transform comprising:
      generating a second two-dimensional arrangement of regions with reference to the first two-dimensional arrangement of regions and a pseudo-random mapping transformation to change a location of at least two regions from the first and second portions of the regions in the first two-dimensional arrangement of regions to different locations in a first dimension and a second dimension of the second two-dimensional arrangement; and storing the second two-dimensional arrangement of feature descriptors into an electronic database.

2. The method of claim 1 wherein the acquired image is an acquired image of a human eye.

3. The method of claim 2 wherein the biometric feature in the isolated region of the human eye image is an iris.

4. The method of claim 1, the transformation of the extracted image data for each identified feature further comprising:

applying at least one Gabor filtering transformation to the extracted image data for each identified feature.

5. The method of claim 1, the generation of the second arrangement further comprising:

generating pseudo-random numbers with a seed number; and selecting feature descriptors from the first arrangement of feature descriptors and mapping the selected feature descriptors into the second arrangement of feature descriptors with reference to the pseudo-random numbers.

6. A method for authenticating a biometric feature in an image of an anatomical feature comprising:

acquiring an image of an anatomical feature having a biometric feature;

isolating a region of the image having the biometric feature;

extracting image data from the image of the region to identify a plurality of features for the biometric feature;

transforming the extracted image data for each identified feature into a plurality of feature descriptors;

mapping the feature descriptors for the plurality of features into a first two-dimensional arrangement of feature descriptors corresponding to locations of features in the image data;

generating a second two-dimensional arrangement by applying a non-invertible transform to the first two-dimensional arrangement of feature descriptors to generate the second two-dimensional arrangement with at least two feature descriptors from the first two-dimensional arrangement being placed in different locations in a first dimension and a second dimension of the second two-dimensional arrangement;

retrieving a third two-dimensional arrangement of feature descriptors for a biometric feature previously stored in an electronic database from the electronic database;

comparing the second two-dimensional arrangement of feature descriptors to the third two-dimensional arrangement of feature descriptors; and generating a signal indicating whether the second two-dimensional arrangement of the feature descriptors for the biometric feature corresponds to the third two-dimensional arrangement of feature descriptors for the biometric feature.

7. The method of claim 6 wherein the anatomical feature is a human eye.

8. The method of claim 7 wherein the biometric feature is an iris.

9. The method of claim 6, the transformation of the extracted image data for each identified feature further comprising:

applying at least one Gabor filtering transformation to the extracted image data for each identified feature.

10. The method of claim 6, the non-invertible transformation of the first arrangement of feature descriptors further comprising:

generating pseudo-random numbers with a seed number; and mapping the first arrangement of feature descriptors into the second arrangement of feature descriptors with reference to the pseudo-random numbers.

11. The method of claim 6 wherein the comparing further comprises:

comparing each feature descriptor in the second arrangement of feature descriptors to a corresponding feature descriptor in the retrieved arrangement of feature descriptors; and comparing each feature descriptor in the second arrangement of feature descriptors with at least one feature descriptor adjacent to the corresponding feature descriptor in the retrieved arrangement of feature descriptors.

12. A system for authenticating a biometric feature in an image of an anatomical feature comprising:

a digital camera configured to acquire an image of an anatomical feature having a biometric feature of a subject;

an electronic database for storage of at least one arrangement of feature descriptors for the biometric feature; and a digital image processor configured to:

isolate a region of the image having the biometric feature;

extract image data from the image of the region to identify a plurality of features for the biometric feature;

transform the extracted image data for each identified feature into a plurality of feature descriptors;

map the plurality of feature descriptors into a first two-dimensional arrangement of feature descriptors;

apply a non-invertible transform to the first two-dimensional arrangement of feature descriptors to generate a second two-dimensional arrangement of feature descriptors with at least two feature descriptors from the first two-dimensional arrangement being placed in different locations in a first dimension and a second dimension of the second two-dimensional arrangement;

retrieve athird two-dimensional arrangement of feature descriptors for a biometric feature from the electronic database;

compare the second two-dimensional arrangement of feature descriptors to the third two-dimensional arrangement of feature descriptors; and generate a signal indicating whether the second two-dimensional arrangement of feature descriptors corresponds to the third two-dimensional arrangement of feature descriptors.

13. The system of claim 12 wherein the anatomical feature is an eye.

14. The system of claim 13 wherein the biometric feature is an iris.

15. The system of claim 12, the digital image processor further configured to transform the extracted image data by applying at least one Gabor filtering transformation to the extracted image data for each identified feature.

16. The system of claim 12 further comprising:

a pseudo-random number generator configured to accept a seed number and to generate pseudo-random numbers based on the seed number; and the digital image processor further configured to receive the pseudo-random numbers from the pseudo-random number generator and to map the first arrangement of feature descriptors into the second arrangement of feature descriptors with reference to the pseudo-random numbers.

17. The system of claim 16 further comprising:
a token, the token configured to generate the seed number.

18. The system of claim 12 wherein the digital image processor is further configured to compare each of the feature descriptors in the second arrangement of feature descriptors with a corresponding feature descriptors in the retrieved arrangement of feature descriptors and to compare each of the feature descriptors in the second arrangement of feature descriptors with at least one feature descriptor adjacent to the corresponding feature descriptor in the retrieved arrangement of feature descriptors.

19. The system of claim 12 further comprising a display operatively connected to the digital image processor and configured receive the signal from the digital image processor, wherein the display shows a first message when the digital image processor generates a signal indicating the second arrangement of feature descriptors corresponds to the retrieved arrangement of feature descriptors, and the display shows a second message when the digital image processor generates a signal indicating that the second arrangement of feature descriptors does not correspond to the retrieved arrangement of feature descriptors, the second message being different than the first message.

\* \* \* \* \*